…

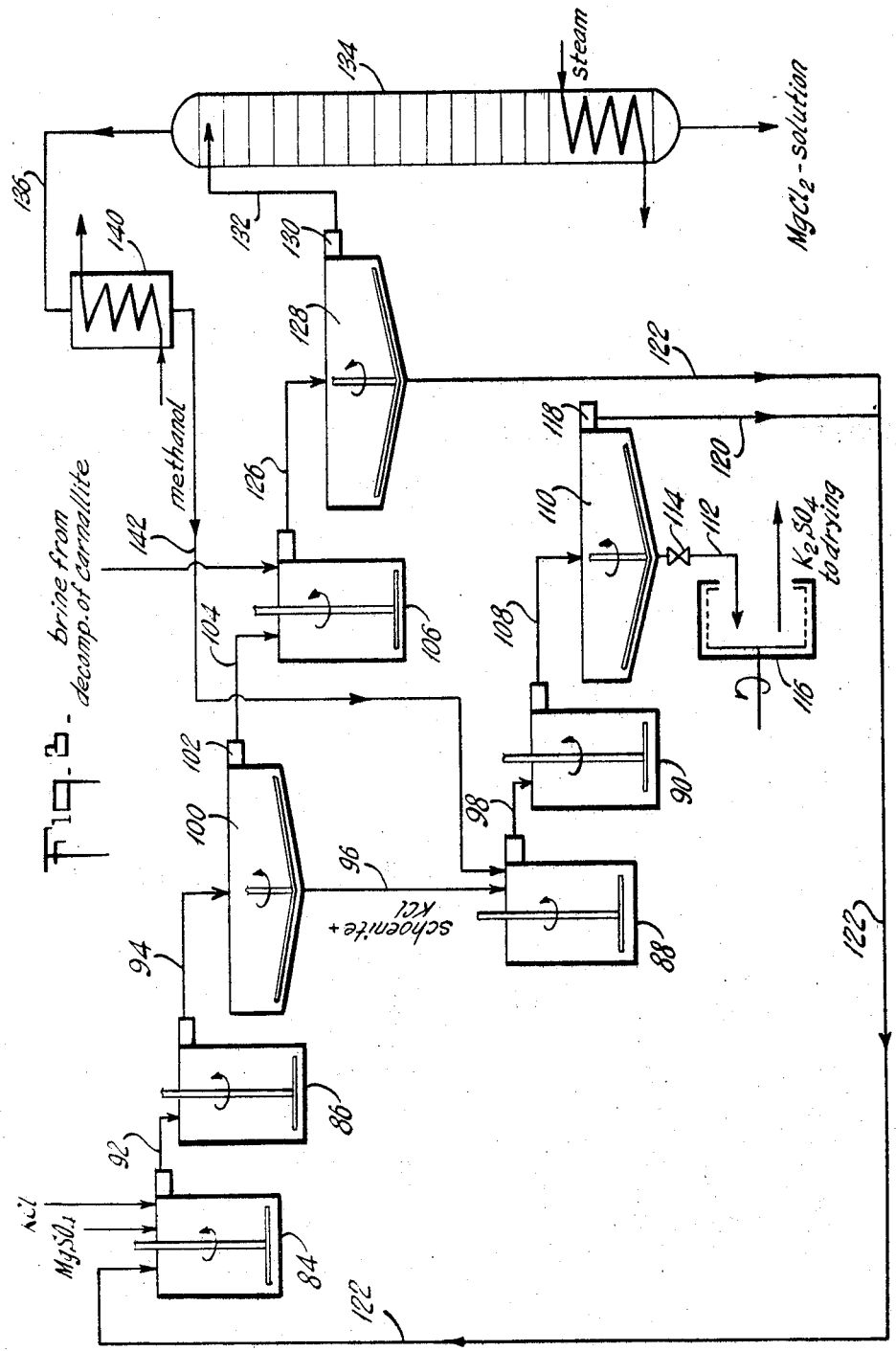

United States Patent Office 3,423,171
Patented Jan. 21, 1969

---

3,423,171
METHOD FOR MAKING ALKALI METAL SULFATE
Hans Hoppe and Heinz Scherzberg, Sondershausen, Germany, assignors to Kali-Forschungsinstitut, Sondershausen, Germany
Filed June 14, 1966, Ser. No. 557,473
U.S. Cl. 23—121      4 Claims
Int. Cl. C01d 5/10

---

ABSTRACT OF THE DISCLOSURE

Method for making potassium sulfate in which potassium chloride is reacted with magnesium sulfate-containing substance of the group consisting of Epsom salt, schoenite and anhydrous magnesium sulfate in the presence of a solvent which is selective for $MgCl_2$, whereby there is formed a solution of $MgCl_2$ in the solvent and a precipitate comprising potassium sulfate.

---

Figure 1:
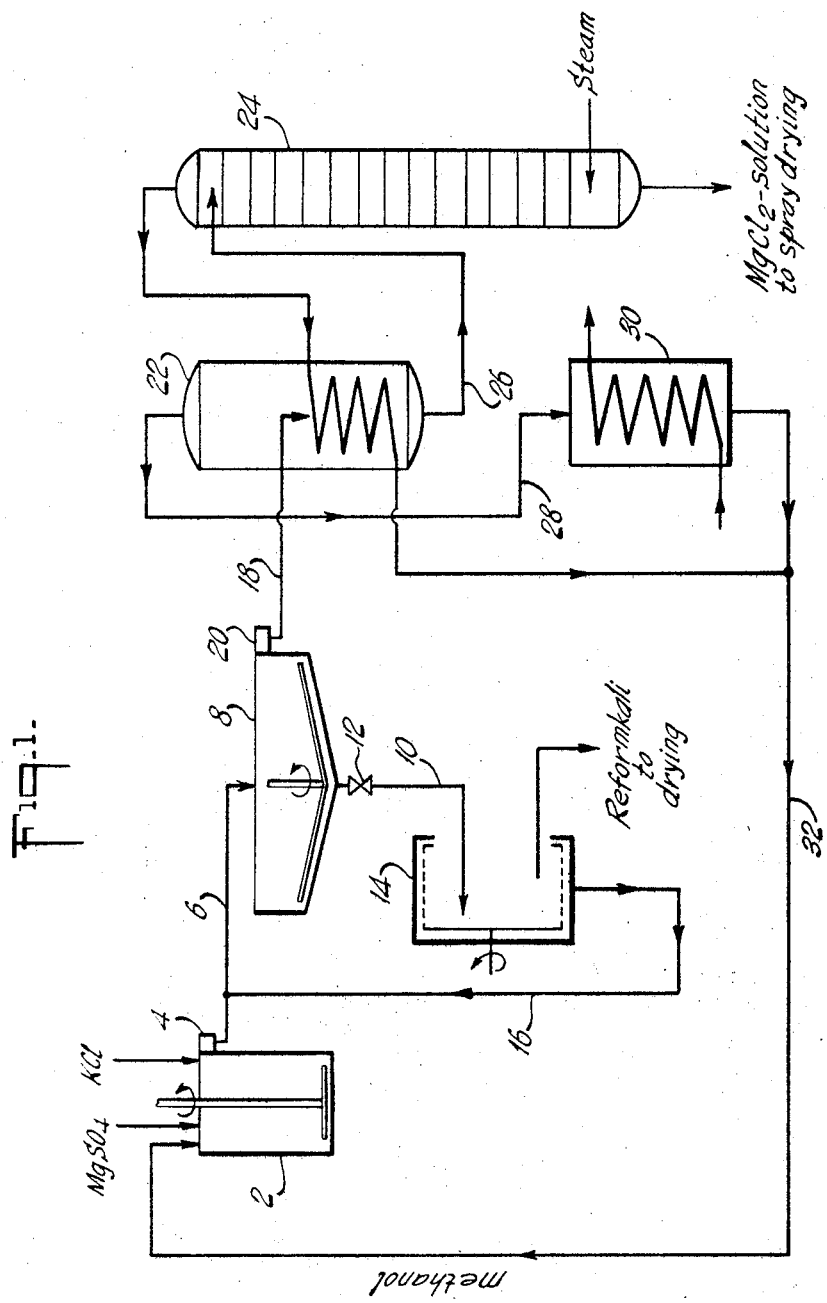
Figure 2:
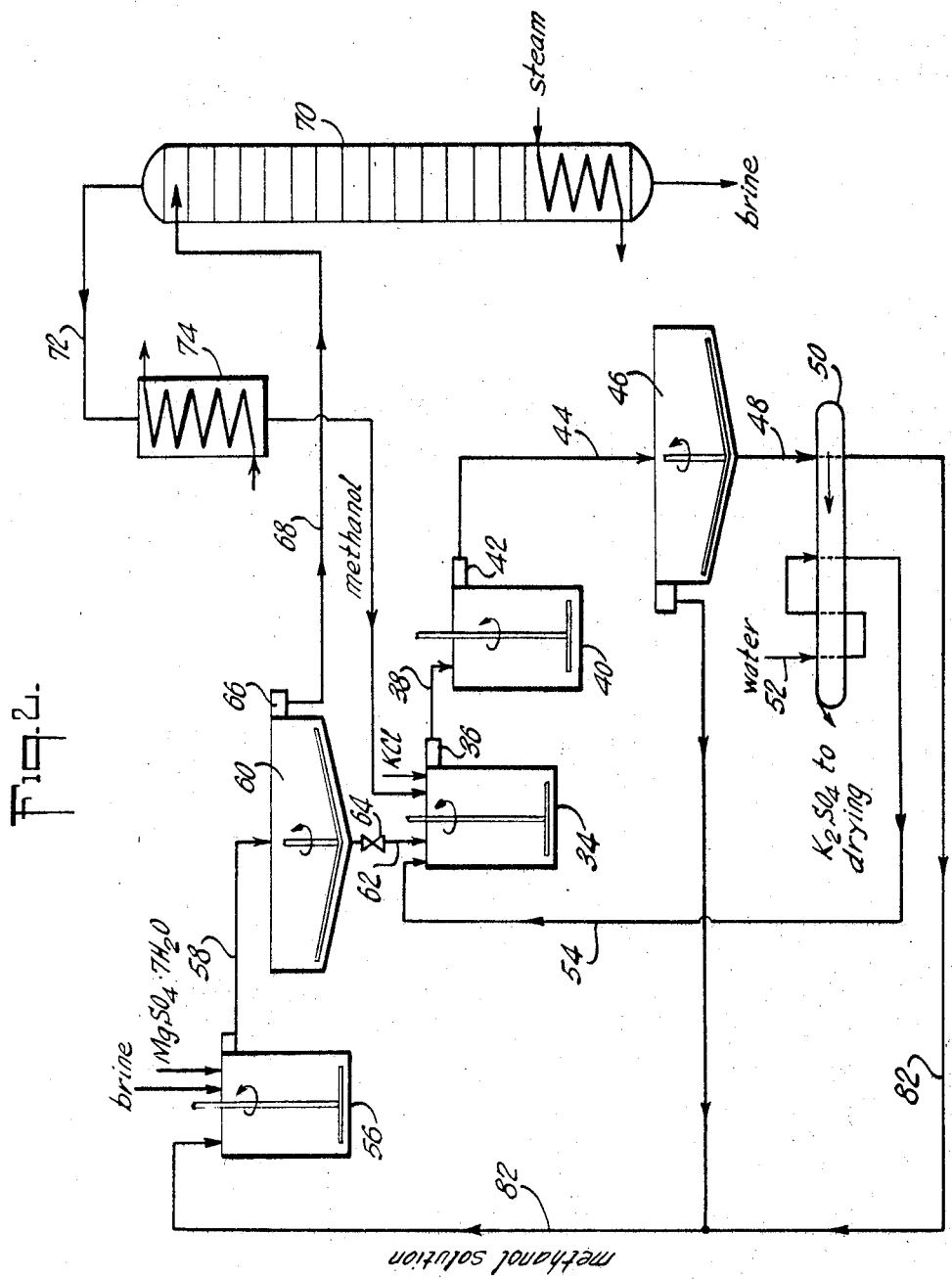

The present invention relates to a method for making alkali metal sulfates.

The technical production methods for alkali metal sulfates were based hitherto exclusively on water as solvent. High losses of water and valuable compounds are the result of the high solubility of the salts in water, rendering these production methods very uneconomical. This is true with respect to the sodium sulfate—as well as the potassium sulfate- and schoenite production. The loss of valuable alkaline compounds and of sulfates are due to the high solubility of these compounds in water even in the cold so that a considerable amount of the salts remains in the aqueous solution besides the magnesium chloride which has been formed by the conversion.

The attempt to recover the salts from their solution encounters considerable difficulties. Therefore, these solutions were disposed of without being worked up, or they had to be used in a process for making potassium chloride.

It is an object of the present invention to overcome the drawbacks of the existing processes for producing alkali metal sulfates by providing a method which permits avoiding the losses in useful materials and to recover the salts by simple and inexpensive operations.

It is a further object of the invention to improve the processing of potassium salts and to render it more economical. Other objects and advantages of the method according to the invention will become apparent from the full description herein below.

It has been found that the above mentioned disadvantages can be completely eliminated in accordance with the invention, when an organic selective solvent will be used instead of the non-specific solvent water; the specific solvent is so chosen that it will dissolve only the magnesium chloride formed during the reaction, and not the alkali metal sulfate to be obtained. One such specifically acting solvent was found in methanol. Other organic solvents which selectively dissolve magnesium chloride may also be used successfully, for instance, ethanol, acetone and dimethyl formamide, either alone or in a mixture with each other, or with methanol or water.

The process for producing the alkali metal sulfates is very simple. The equimolar mixture of the starting materials, alkali metal chloride and magnesium sulfate, or magnesium sulfate hydrate, is stirred with a suitable quantity of a selective solvent which is separated therefrom by known methods after the conversion. The solution contains the magnesium chloride resulting from the reaction, while the solid phase consists exclusively of alkali metal sulfate. It is advantageous to add a low amount of water which causes the reaction to proceed more rapidly and which is partly used up as crystal water.

The recovering of the solvent can be done by distillation. During the evaporation process, a pure magnesium chloride hydrate will be obtained. It is also possible to use the organic $MgCl_2$-solution for the selective salting out of aqueous salt solutions.

The invention comprises a plurality of embodiments, according to the type and quantity of the alkali metal chloride, the magnesium sulfate, or the hydrate stages thereof used, and the solvent selected. Thus, the conversion of dehydrated magnesium sulfate with potassium chloride in the molar ratio of 1:1 in 85% methanol yields the double salt schoenite ($K_2SO_4 \cdot MgSO_4 \cdot 6H_2O$) in a simple reaction. When using two moles potassium chloride per mole $MgSO_4$, potassium sulfate will be obtained when the quantity of solvent is selected sufficiently large so that the $MgCl_2$-concentration in the solution does not exceed 60 g. per liter. When less solvent is used, a mixture of schoenite and KCl is obtained which is required for the production of so called "Reformkali," e.g. a product containing 26 to 30% $K_2O$, 26 to 30% $MgSO_4$, 14 to 20% $CaSO_4$ wherein the Cl-content of the product must be below 12.5%. The same products are obtainable when starting from Epsom salt or kieserite. When using Epsom salt as a starting product, water need not be added to the solvent. When schoenite is used, a pure potassium sulfate can likewise be produced by conversion with potassium chloride and a sufficient amount of 85% to 95% methanol. In this case, too, the $MgCl_2$-concentration must remain below the mentioned limit. For making double salts, the use of fresh solvent is not necessarily required. For this purpose a methanol solution containing $MgCl_2$ may be advantageously used which can be obtained, for instance, during the alkali metal sulfate production.

In analogous reactions, by using sodium chloride, astrakanite ($Na_2SO_4 \cdot MgSO_4 \cdot 4H_2O$) or thenardite ($Na_2SO_4$) are obtainable. When using KCl-NaCl mixtures in suitable composition, the double salt glaserite $$(Na_2SO_4 \cdot 3K_2SO_4)$$

is obtained instead of the potassium sulfate. Glaserite represents a chlorine-free fertilizer material with a 40% $K_2O$ content.

In the following, the invention will be more fully described in a number of examples, and illustrated by flow sheets. It should, however, be understood that these are given by way of illustration and not of limitation and that many changes in details can be made without departing from the scope of the invention.

Example 1.—(See Flow Sheet 1)

Production of "Reformkali" and magnesium chloride dihydrate.

Into a stirring vessel 2 provided with an overflow 4, we introduce a mixture of wet potassium chloride and dehydrated magnesium sulfate as well as methanol. In this manner, a mixture of KCl and schoenite is obtained which will be separated in a thickener 8. After separation, this product is passed through a conduit 10 which is provided with a valve 12 into a centrifuge 14, and from there through conduit 15 to the final drying process. After the final drying the product has the quality of the so called "Reformkali." The filtrate which accumulates in the centrifuge 14 is passed through a conduit 16 and a further condiut 6 into thickener 8. The obtained methanolic $MgCl_2$-solution will be passed from thickener 8 through an overflow 20. Another portion of this solution adheres to the solid material and is recovered by an indirect drying process. From overflow 20 the solution is passed through a conduit 18 into a vacuum evaporator 22 wherein the methanol and the water are partly evaporated. The thickened $MgCl_2$-solution flows from the vacuum vessel 22 through a conduit 26 into distillation column 24. By adding water in form of injected heating vapor which is injected by a heating vapor source (not shown), the balance of the methanol is obtained as 98% distillate which is heating the evaporator 22 and thereby condensing. The evaporated methanol is passed from the vacuum evaporator 22 through a return conduit 28 to a condensing coil 30 and a further conduit 32 into vessel 2. The methanol-free hot $MgCl_2$-solution will be passed from the sump to a spray drier and magnesium chloride dihydrate is obtained, the starting product of the MgO-production. The quantities used in the above described method are explained in detail in Table 1.

Example 2.—(See Flow Sheet 2)

Production of $K_2SO_4$ from schoenite obtained in a salting out process.

In a stirring vessel 34 a mixture of wet potassium chloride, schoenite suspension and 90% methanol as well as water will be continuously stirred at normal temperature. This slurry which flows from the stirring vessel 34 is passed though an overflow 36 and a conduit 38 into a second stirring vessel 40, the volume of which is calculated so as to achieve a total dwell time of 50 to 60 minutes. Said mixture flows from this second stirring vessel through an overflow 42 and a conduit 44 into a thickener 46 wherein it is thickened. From thickener 46, the $K_2SO_4$-pulp is passed through a conduit 48 onto a band filter 50 and is pre-dried thereon. The remaining solvents will be removed from the salt by a multi-step cross counter current washing process, i.e. water is sprayed from a water source 52 vertically onto the filter cake which moves in a horizontal direction on the band filter 50. This washing liquid which contains in the dissolved state $K_2SO_4$ will be returned to the stirring vessel 34 by means of conduit 54. The filtrate of the band filter 50 is combined with the upper phase of the settling vessel 46 and flows as a precipitating agent through a return conduit 82 into the stirring vessel 56 where the salting out process takes place.

The admixture of the components brine, methanol solution, and Epsom salt takes place in said continuously operating stirring vessel 56. The dwell time is 20–25 minutes.

The continuously outflowing slurry is passed from stirring vessel 56 through a conduit 58 into thickener 60 wherein it is thickened. Methanol solution and schoenite pulp are obtained. The schoenite pulp will be drawn off into the stirring vessel 34 through conduit 62 which is provided with a valve 64. The methanol solution flows from thickener 60 through overflow 66 and through a conduit 68 into a distillation column 70. In the distillation column 70 the methanol solution is separated into the components methanol and salt solution. 90% methanol are recovered which flow from the distillation column 70, through a conduit 72, a condensing coil 74 and a further conduit 76 into the stirring vessel 34. From stirring vessel 34, the methanol flows into stirring vessel 40 and into thickener 46. As already mentioned, the methanol is then returned to the stirring vessel 56 by flowing through an overflow 78 of thickener 46, through a conduit 80 and the return conduit 82. The solid phase is passed through conduit 48 and onto band filter 50, as already mentioned above.

The brine which flows out from the column sump is disposed of. The quantities used for the above described method are explained in detail in Table 2.

Example 3.—(See Flow Sheet 3)

Production of potassium sulfate from schoenite obtained in a conversion process.

When the solid mixture from Example 1 is treated with fresh solvent, it will be converted into potassium sulfate. The methanol solution can advantageously be used as solvent for the schoenite production. The solution obtained from this stage may be either evaporated to magnesium chloride dihydrate or may be used for salting out of potassium chloride from solutions resulting from the decomposition of carnallite. In this case, the methanol is used three times before it has to be regenerated by means of distillation. The process takes place in the following manner.

A potassium chloride-schoenite mixture which is suspended in a methanol solution, as well as methanol will be continuously converted in a system consisting of two stirring vessels 88 and 90 which are connected with each other by a conduit 98. Said mixture is then passed from these stirring vessels through a conduit 108 into a thickener 110. The upper phase of thickener 110 is passed through an overflow 118 and a conduit 120 into a return conduit 122 which is connected with a stirring vessel 84. The thickened lower phase of thickener 110 is passed through a conduit 112 which is provided with a valve 114 into a centrifuge 116 for a pre-drying process. For complete drying, the $K_2SO_4$ is removed from the centrifuge. The solvent, adhering at the wet salt will be recovered by an indirect drying process. The methanol solution will be passed on to the second stirring system consisting of vessels 84 and 86 which are connected with each other by a conduit 92, to form the schoenite from the following components: wet potassium chloride, calcined magnesium sulfate, as well as a KCl suspension which is yielded during the brine desalting. The out flowing sludge is passed through a conduit 94 to a thickener 100. The thickened solid phase is passed through a conduit 96 to the $K_2SO_4$-conversion into stirring vessel 88, as mentioned above. The methanol solution which flows from an overflow 102 will be passed through a conduit 104 into a stirring vessel 106 which is also provided with an overflow. The methanol solution is mixed with brine from a cold decomposition of the carnallite. Thereby a mixture of KCl–NaCl will be crystallized. It is suspended in a solution and flows through a conduit 126 into a thickener 128. The lower phase which is used for the schoenite production flows through a conduit 122 and returns into stirring vessel 84. The upper phase flows through an overflow 130 and through conduit 132 into a distillation column 134 wherein it is distilled. Methanol is recovered and is passed through a conduit 136, a condensing coil 140, and a return conduit 142 into stirring vessel 88. The remainder of the liquid flows out from the column sump. The quantities used for the above described method are described in detail in Table 3.

This invention should not, however, be limited to the specific embodiments shown by the appended drawings, but rather defined by the scope of the appended claims.

TABLE 1.—FLOW RATES

| Stream Number | Description | Percent Solids | Ton Solids | Ton Liquids | Flow Rate (percent) | | | | | | |
|---|---|---|---|---|---|---|---|---|---|---|---|
| | | | | | KCl | K₂SO₄ | MgSO₄ | MgCl₂ | NaCl | H₂O | CH₃OH |
| 1 | Potash | 82.0 | 1.26 | 0.28 | 83.3 | | | 0.3 | 4.1 | 12.3 | |
| 2 | Magn. Sulf | 100 | 1.33 | | | | 96.4 | | | | |
| 3 | Methanol | | | 4.00 | | | | | | 20 | 80 |
| 4 | Slurry | 40.8 | 2.60 | 4.27 | S. 16.5<br>L. 0.4 | | 35.6 | 24.4<br>12.0 | 1.8 | 22.0<br>10.8 | 75.0 |
| 5 | do | 52.0 | 2.90 | 2.96 | S. 16.5<br>L. 0.4 | | 35.6 | 24.4<br>12.0 | 1.8 | 22.0<br>10.8 | 75.0 |
| 6 | Brine | | | 4.05 | 0.4 | | | 12.0 | 1.8 | 10.8 | 75.0 |
| 7 | do | 10.0 | 0.30 | 2.74 | S. 16.5<br>L. 0.4 | | 35.6 | 24.4<br>12.0 | 1.8 | 22.0<br>10.8 | 75.0 |
| 8 | Cake | 93.0 | 2.60 | 0.22 | S. 16.5<br>L. 0.4 | | 35.6 | 24.4<br>12.0 | 1.8 | 22.0<br>10.8 | 75.0 |
| 9 | Calz. Sulf | 100 | 0.60 | | | | 8.5 | | 0.4 | | |
| 10 | Fin. Prod | 100 | 2.60 | | 18.1 | 33.8 | 26.4 | | 0.2 | | |
| 11 | Destillate | | | 0.18 | | | | | | 12.5 | 87.5 |
| 12 | do | | | 1.62 | | | | | | 7.5 | 92.5 |
| 13 | Brine | | | 2.43 | 0.6 | | | 19.8 | 3.0 | 13.0 | 63.0 |
| 14 | Destillate | | | 1.71 | | | | | | 10.0 | 90.0 |
| 15 | Brine | | | 1.42 | 1.0 | | | 34.0 | 5.1 | 59.9 | |
| 16 | Vapor | | | 0.56 | | | | | | 100 | |
| 17 | Water | | | 0.49 | | | | | | 100 | |
| 18 | Vapor | | | 0.69 | | | | | | 100 | |
| 19 | Magn. Chlor | 100 | 0.73 | | | | | 66.7 | | 33.3 | |

TABLE 2.—FLOW RATES

| Stream Number | Description | Percent Solids | Ton Solids | Ton Liquids | Flow Rate (percent) | | | | | | |
|---|---|---|---|---|---|---|---|---|---|---|---|
| | | | | | KCl | K₂SO₄ | MgSO₄ | MgCl₂ | NaCl | H₂O | CH₃OH |
| 1 | Potash | 84.0 | 1.85 | 0.35 | 83.3 | | | 0.3 | 4.1 | 12.3 | |
| 2 | Methanol | | | 20.6 | | | | | | 10.0 | 90.0 |
| 3 | Slurry | 50.5 | 4.3 | 4.2 | S.<br>L. 0.9 | 43.3 | 29.8<br>1.5 | 9.8 | 3.1 | 27.8<br>48.1 | 36.1 |
| 4 | Brine | | | 2.8 | 0.3 | 10.9 | | 0.2 | 0.1 | 89.5 | |
| 5 | Slurry | 12.1 | 4.1 | 30.0 | S. 0.1<br>L. 1.3 | 97.5 | 0.9<br>4.9 | 0.6 | 0.1<br>0.6 | 0.8<br>26.1 | 67.1 |
| 6 | Brine | | | 22.0 | 1.3 | | | 4.9 | 0.6 | 26.1 | 67.1 |
| 7 | Slurry | 33.8 | 4.1 | 8.0 | S. 0.1<br>L. 1.3 | 97.5 | 0.9<br>4.9 | 0.6 | 0.1<br>0.6 | 0.8<br>26.1 | 67.1 |
| 8 | Brine | | | 7.4 | 1.3 | | | 4.9 | 0.6 | 26.1 | 67.1 |
| 9 | Cake | 87.0 | 4.1 | 0.6 | S. 0.1<br>L. 1.3 | 97.5 | 0.9<br>4.9 | 0.6 | 0.1<br>0.6 | 0.8<br>26.1 | 67.1 |
| 10 | Water | | | 2.5 | | | | | | 100 | |
| 11 | Cake | 86.5 | 3.8 | 0.6 | S.<br>L. 0.3 | 98.9<br>10.9 | 0.6 | 0.2 | 0.1 | 0.5<br>89.5 | |
| 12 | Pot. Sulfate | 100 | 3.9 | | | 99.3 | 0.7 | | | | |
| 13 | Brine | | | 30.0 | 1.3 | | | 4.9 | 0.6 | 26.1 | 67.1 |
| 14 | do | | | 28.5 | 6.0 | | 6.6 | 13.1 | 6.8 | 67.5 | |
| 15 | Eps. Salt | 83.0 | 0.5 | 0.1 | | | 46.9 | | | 53.1 | |
| 16 | Slurry | 7.3 | 4.3 | 54.8 | S.<br>L. 0.9 | 43.3 | 29.8<br>1.5 | 9.8 | 3.1 | 27.8<br>48.1 | 36.5 |
| 17 | do | 50.5 | 4.3 | 4.2 | S.<br>L. 0.9 | 43.3 | 29.8<br>1.5 | 9.8 | 3.1 | 27.8<br>48.1 | 36.5 |
| 18 | Brine | | | 50.6 | 0.9 | | 1.5 | 9.8 | 3.1 | 48.1 | 36.5 |
| 19 | Destillate | | | 20.6 | | | | | | 10.0 | 90.0 |
| 20 | Brine | | | 30.0 | 1.5 | | 2.5 | 10.6 | 5.2 | 74.2 | (0.004) |
| 21 | Vapor | | | 0.5 | | | | | | 100 | |

TABLE 3.—FLOW RATES

| Stream Number | Description | Percent Solids | Ton Solids | Ton Liquids | Flow Rate (percent) | | | | | | |
|---|---|---|---|---|---|---|---|---|---|---|---|
| | | | | | KCl | K₂SO₄ | MgSO₄ | MgCl₂ | NaCl | H₂O | CH₃OH |
| 1 | Potash | 82.0 | 1.28 | 0.3 | 83.3 | | | 0.3 | 4.1 | 12.3 | |
| 2 | Magn. Sulf | 100 | 1.35 | | | | 95.5 | | | | |
| 3 | Brine | | | 12.0 | 0.5 | | | 6.7 | | 17.9 | 74.9 |
| 4 | Slurry | 53.5 | 0.40 | 0.35 | S. 93.5<br>L. 0.8 | | 1.6 | 20.3 | 6.5<br>1.5 | 47.3 | 28.5 |
| 5 | do | 19.3 | 3.00 | 12.6 | S. 28.4<br>L. 0.6 | 31.0 | 21.4<br>10.6 | 0.9 | 19.2<br>15.7 | 72.2 | |
| 6 | Brine | | | 9.9 | 0.6 | | | 10.6 | 0.9 | 15.7 | 72.2 |
| 7 | Slurry | 53.0 | 3.00 | 2.65 | S. 28.4<br>L. 0.6 | 31.0 | 21.4<br>10.6 | 0.9 | 19.2<br>15.7 | 72.2 | |
| 8 | do | 13.3 | 1.86 | 12.1 | S.<br>L. 0.5 | 100 | | 6.7 | | 17.9 | 74.9 |
| 9 | do | 42.2 | 2.14 | 2.9 | S.<br>L. 0.5 | 100 | | 6.7 | | 17.9 | 74.9 |
| 10 | Brine | | | 12.0 | 0.5 | | | 6.7 | | 17.9 | 74.9 |
| 11 | Slurry | 9.0 | 0.28 | 2.8 | S.<br>L. 0.5 | 100 | | 6.7 | | 17.9 | 74.9 |
| 12 | Cake | 94.0 | 1.86 | 0.1 | S.<br>L. 0.5 | 100 | | 6.7 | | 17.9 | 74.9 |
| 13 | Product | 100 | 1.86 | | | 99.9 | | 0.1 | | | |
| 14 | Vapor | | | 15.4 | | | | | | 18.0 | 82.0 |
| 15 | Brine | | | | 3.4 | | 2.6 | 26.0 | 1.9 | 66.1 | |
| 16 | Slurry | 1.4 | 0.4 | 24.3 | S. 93.5<br>L. 0.8 | | 1.6 | 20.3 | 6.5<br>1.5 | 47.3 | 28.5 |
| 17 | Brine | | | 24.5 | 0.8 | | 1.6 | 20.3 | 1.5 | 47.3 | 28.5 |
| 18 | Methanol | | | 8.4 | | | | | | 15.0 | 85.0 |
| 19 | Brine | | | 16.3 | 1.3 | | 2.4 | 31.4 | 2.2 | 63.7 | |
| 20 | Methanol | | | 8.2 | | | | | | 15.0 | 85.0 |

What we claim is:

1. Method for making potassium sulfate, comprising reacting potassium chloride with a magnesium sulfate-containing substance of the group consisting of Epsom salt, schoenite and anhydrous magnesium sulfate in the presence of a solvent which is selective for $MgCl_2$, said solvent comprising at least one organic solvent of the group consisting of methanol, ethanol, acetone and dimethyl formamide, in admixture with water thereby to form a solution of $MgCl_2$ in said solvent and a precipitate comprising potassium sulfate.

2. Method according to claim 1, further comprising separating said solution from said precipitate.

3. Method according to claim 2, further comprising evaporating the organic solvent from said solution thereby to obtain an aqueous solution of $MgCl_2$.

4. Method according to claim 2, further comprising evaporating both the organic solvent and the water from said solution thereby to obtain hydrated $MgCl_2$.

References Cited

UNITED STATES PATENTS

| 2,381,994 | 8/1945 | Belchetz | 23—91 |
| 2,381,995 | 8/1945 | Belchetz | 23—91 |
| 2,902,341 | 9/1959 | Baniel et al. | 23—50 |
| 3,110,561 | 11/1963 | Henne et al. | 23—121 |
| 3,207,576 | 9/1965 | Marullo | 23—121 |

FOREIGN PATENTS

| 255,042 | 4/1927 | Great Britain. |

EARL C. THOMAS, *Primary Examiner.*

G. O. PETERS, *Assistant Examiner.*

U.S. Cl. X.R.

23—91